United States Patent
Gantepla et al.

(10) Patent No.: US 10,059,874 B2
(45) Date of Patent: Aug. 28, 2018

(54) PROPPANTS FOR SUBTERRANEAN FORMATIONS AND METHODS OF USING THE SAME

(71) Applicant: Halliburton Energy Services, Inc., Houston, TX (US)

(72) Inventors: Anita Gantepla, Taluk and District: Davangere (IN); Ramya Krishna Kothamasu, Andhra Pradesh (IN); Manojkumar Achalpurkar, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/896,409

(22) PCT Filed: Jul. 31, 2013

(86) PCT No.: PCT/US2013/053009
§ 371 (c)(1),
(2) Date: Dec. 7, 2015

(87) PCT Pub. No.: WO2015/016905
PCT Pub. Date: Feb. 5, 2015

(65) Prior Publication Data
US 2016/0122629 A1 May 5, 2016

(51) Int. Cl.
*E21B 43/267* (2006.01)
*C09K 8/80* (2006.01)
(Continued)

(52) U.S. Cl.
CPC ............ *C09K 8/80* (2013.01); *C08G 73/1046* (2013.01); *C08L 79/08* (2013.01); *C09K 8/56* (2013.01);
(Continued)

(58) Field of Classification Search
None
See application file for complete search history.

(56) References Cited

U.S. PATENT DOCUMENTS

| 7,334,635 | B2 | 2/2008 | Nguyen |
| 8,227,026 | B2 | 7/2012 | Mcdaniel et al. |

(Continued)

FOREIGN PATENT DOCUMENTS

WO WO-2015016905 A1 2/2015

OTHER PUBLICATIONS

"International Application Serial No. PCT/US2013/053009, International Preliminary Report on Patentability dated Feb. 11, 2016", 14 pgs.

(Continued)

*Primary Examiner* — Angela M DiTrani
*Assistant Examiner* — Andrew Sue-Ako
(74) *Attorney, Agent, or Firm* — Chamberlain Hrdlicka (57) ABSTRACT

The present disclosure relates to proppants for the treatment of subterranean formations, and methods of using the same. In various embodiments, the present invention provides a proppant for treatment of a subterranean formation, wherein the proppant is polymeric and includes polyetherimide (PEI). Various embodiments also provide methods of using the polymeric proppant, including for deposition of proppants, stimulating production, fracturing, sand control, and combinations thereof.

17 Claims, 1 Drawing Sheet

(51) Int. Cl.
  *C09K 8/56* (2006.01)
  *C09K 8/62* (2006.01)
  *C08L 79/08* (2006.01)
  *C08G 73/10* (2006.01)
  *C09K 8/92* (2006.01)
  *E21B 43/26* (2006.01)

(52) U.S. Cl.
  CPC .............. *C09K 8/62* (2013.01); *C09K 8/805* (2013.01); *C09K 8/92* (2013.01); *E21B 43/26* (2013.01); *E21B 43/267* (2013.01)

(56) References Cited

U.S. PATENT DOCUMENTS

| | | | |
|---|---|---|---|
| 8,307,897 B2 | 11/2012 | Reyes et al. | |
| 2006/0078682 A1* | 4/2006 | McDaniel | C09K 3/1436 427/372.2 |
| 2009/0314488 A1 | 12/2009 | Droger | |
| 2012/0205100 A1 | 8/2012 | Kaufman et al. | |
| 2013/0112409 A1 | 5/2013 | Baleno et al. | |

OTHER PUBLICATIONS

McDaniel, Gregory A., "Changing the Shape of Fracturing: New Proppant Improves Fracture Condutivity", *SPE-135360, SPE Annual Technical Conference and Exhibition*, Sep. 19-22, Florence, Italy, (2010), 1-21.

"International Application Serial No. PCT/US2013/053009, International Search Report dated Apr. 24, 2014", 3 pgs.

"International Application Serial No. PCT/US2013/053009, Written Opinion dated Apr. 24, 2014", 12 pgs.

* cited by examiner

PROPPANTS FOR SUBTERRANEAN FORMATIONS AND METHODS OF USING THE SAME

PRIORITY APPLICATION

This application is a U.S. National Stage Filing under 35 U.S.C. 371 from International Application No. PCT/US2013/053009, filed Jul. 31, 2013; and published as WO 2015/016905 on Feb. 5, 2015; which application and publication is incorporated herein by reference in their entirety.

BACKGROUND OF THE INVENTION

Hydraulic fracturing is the propagation of fractures in a subterranean material, such as rock, by the use of a pressurized fluid. Induced hydraulic fracturing, or fracking, is a technique used to release petroleum, natural gas, or other substances for extraction from reservoir subterranean formations via a wellbore. A proppant is a material that can keep an induced hydraulic fracture at least partially open during or after fracturing. Proppants can be transported downhole to the fracture using fluid, such as fracturing fluid or carrier fluid.

Higher density proppants typically provide an increase in strength, but also require higher-viscosity fluid to more effectively transport the higher density proppants to a desired location downhole. Larger mesh-sized proppants can have greater permeability at increased stresses than smaller mesh size proppants, but typically are less crush resistant or produce fines under increased pressures.

SUMMARY OF THE INVENTION

In various embodiments, the present invention provides a method of treating a subterranean formation. The method can include contacting the subterranean formation with a proppant, such as a polymeric proppant comprising at least one of polyetherimide (PEI), a PEI copolymer, and a PEI composite. The polymeric proppant can include at least about 10 wt % to about 100 wt % PEI.

In various embodiments, the present invention provides a method of depositing a proppant into a subterranean formation. The method can include transporting the proppant to the subterranean formation with a carrier fluid or a fracking fluid. The proppant can be polymeric and include PEI, a PEI copolymer, a PEI composite with an inorganic material, or a combination thereof. The method can include contacting the proppant with the subterranean formation and recovering at least a portion of the carrier fluid.

In various embodiments, the present invention provides a method of stimulating production of a subterranean formation. The method can include fracturing a subterranean formation to form a fracture and contacting the fracture with a proppant pack comprising a PEI containing proppant with a specified geometric shape, such as a spherical, cylindrical, or other geometric shape. The proppant pack can exhibit greater conductivity than a corresponding proppant pack of non-polymeric proppants, such as ceramic, glass, sand, or bauxite proppants of equivalent bulk volume.

In various embodiments, the present invention provides a method of fracturing a subterranean material. The method can include obtaining or providing a carrier fluid comprising a proppant, wherein the proppant includes a polymeric material, such as PEI, a PEI copolymer, a PEI composite, or a combination thereof. The method can include fracturing downhole at least part of a subterranean material using a fracturing fluid to create a fracture. The method can further include contacting the fracture with the carrier fluid or the fracking fluid, during or following the fracturing, wherein the proppant at least partially maintains the fracture open.

In various embodiments, the present invention provides a composition for treatment of a subterranean formation. The composition can include a carrier fluid including a polymeric proppant, including PEI, a PEI copolymer, a PEI composite, or a combination thereof with at least about 10 wt % to about 100 wt % PEI.

Various embodiments of the present invention have certain advantages over previous methods for treating subterranean formations, at least some of which are unexpected. Various examples of the present invention provide methods of stimulating or enhancing stimulation of a subterranean formation or well through use of a polymeric proppant. For example, the proppant, such as a polymeric proppant, can increase conductivity, such as the ability for fluid to flow within a fracture, a subterranean formation, a well, or a combination thereof, as compared to non-polymeric proppants, such as ceramic, glass, sand, or bauxite proppants. Such examples can provide the benefit of increasing the productive lifespan of a well by, for example, decreasing the cost of operation of the well or increasing an amount of recoverable hydrocarbon. The proppant, such as a polymeric proppant, can increase conductivity such that the well can experience greater hydrocarbon recovery with equivalent or less energy consumption than a well using spherical shaped proppants.

Various embodiments provide methods of treating, stimulating, depositing, or fracturing a subterranean formation with a proppant including a polymeric material, such as PEI, a PEI copolymer, a PEI composite, or a combination thereof. Such embodiments can provide the benefit of increased strength as compared to non-polymeric proppants, such as ceramic, glass, sand, or bauxite proppants. For example, the proppant of the present disclosure can have higher strength, which can permit use of the proppant in a greater variety of environments than non-polymeric proppants. Embodiments of the proppant having higher crush resistance can be used in subterranean formations with higher closure pressures or less stable fractures. Further, polymeric proppants with higher crush resistivity can decrease the amount of fines generated or particles formed in the subterranean formation, as compared to ceramic, sand, glass, or bauxite proppants. As such, long-term fracture flow capacity, which is directly influenced by the amount of fines present in the proppant pack, can be increased. Such examples can provide a number of benefits, including less fracture fouling, less well bore fouling, or increased stability of a fracture.

In various embodiments, the proppant can have a lower specific gravity than previous proppants. Benefits of such examples can include allowing for lower fracture fluid or carrier fluid flow rates, lower-viscosity fracturing fluid, or lower pressures during fracturing, which can translate to a decrease in fracturing costs, environmentally or economically. Further, increased concentrations of the polymeric proppant can be transported downhole at pressures and flow rates less than or equal to proppants of higher specific gravity. The use of a lower viscosity fracturing fluid, for example, can aid in recovery of the fracturing fluid. Embodiments can include a proppant with an increased strength to specific gravity ratio. Such embodiments can provide the benefit of increasing the concentration of the proppant transportable downhole at equivalent pumping rates or decreasing pump energy needed to get an equivalent amount of proppant downhole.

In various embodiments, the proppant can exhibit greater acid resistivity than previous proppants. Benefits of such embodiments include increased chemical reliability of the proppant, permitting use of additional or more highly acidic additives to the fracturing fluid or carrier fluid that otherwise would be damaging to the proppant, or increased proppant shape retention when transported downhole. Some embodiments include substantially hydrophobic proppants, which can maintain their original weight during transportation, increase conductivity or long-term fracture flow capacity, enhance recovery of fracturing fluid from the fracture or downhole, or at least partially prevent liquid build-up within the fracture. Additionally, the surface characteristics of the proppant can enhance production of hydrocarbons from the fracture.

In various embodiments, the crush resistance, acid resistivity, hydrophobicity, or lipophobicity can inhibit diagenesis when transported in contact or within the subterranean formation. Benefits of such embodiments include greater long-term fracture flow capacity, stimulation of the subterranean formation, increased proppant lifespan, or enhanced recovery of fracturing fluid, or at least partially preventing fluid build-up within a fracture.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "polymer" as used herein refers to a molecule having at least one repeating unit.

The term "PEI copolymer" as used herein refers to a polymer that includes at least two different monomers. A copolymer can include any suitable number of monomers, with at least one being PEI.

The term "PEI composite" as used herein refers to a material made of at least two different constituents having different physical and chemical properties. A composite can include any suitable number of constituent at least one being PEI. The other constituent can be either inorganic, polymeric, or similar.

The term "downhole" as used herein refers to under the surface of the earth, such as a location within or fluidly connected to a wellbore.

As used herein, the term "subterranean material" or "subterranean formation" refers to any material under the surface of the earth, including under the surface of the bottom of the ocean. For example, a subterranean material can be any section of a wellbore, including any materials placed into the wellbore such as cement, casings, tubing, drill shafts, liners, bottom-hole assemblies, or screens. In some examples, a subterranean material can be any section of underground that can produce liquid or gaseous petroleum materials or water.

As used herein, the term "proppant" refers to a material designed to maintain an induced fracture open during or following a fracturing event.

As used herein, the term "permeability" refers to the ability of a material to allow a gas or liquid to pass through the material.

As used herein, the term "acid solubility" refers to the ability of a proppant material to resist dissolution by or reaction with an acidic medium.

As used herein, the term "crush resistance" refers to the ability of a proppant to withstand the forces, such as pressure, exerted on the proppant and resist forming particulate or fines, consequently reducing the overall size of the proppant.

As used herein, the term "fines" or "grains" refer to particulate or material that is disassociated from a proppant due to mechanical or chemical forces.

As used herein, the term "diagenesis" refers to a chemical or physical degradation or dissolution undergone by a proppant or a subterranean formation.

As used herein, the term "conductivity" refers to the ease with which a fluid can flow through a fracture, permeation, or other subterranean feature.

As used herein, the term "aspect ratio" refers to the ratio of a length measurement of a proppant to a width measurement of the proppant, e.g., L:W.

As used herein, the term "proppant pack" refers to a consolidated pack of a plurality of proppants, such as a monolayer proppant pack or a multilayer proppant pack. The plurality of proppants can include copolymers or composites.

Proppant/Polymeric Materials

A polymeric material can includes a polymer or mixture of polymers, as described herein. For example, a polymer material can include PEI or mixtures of PEI. As described herein, PEI, such as polyetherimide beads, has a repeating unit with the molecular formula $C_{37}H_{24}O_6N_2$ which occurs in the polymer as shown in the following chemical structure:

As described herein, a copolymer can include a polymer having at least two different repeating units. For example, a PEI copolymer can include a polymer with a repeating PEI unit and an additional repeating polymer, such as, but not limited to, polyphenylene ether (repeating unit=phenoxy); polyimide (repeating unit includes the structure RC(=O)NR'C(=O)R"); poly(4-vinylpyridine) (repeating unit=4-ethylpyridine); polyvinylpyrrolidone (repeating unit=1-ethylpyrrolidone); polycarbonate; a polyacrylate; a polyolefin; a rubbery dienic polymer; a styrenic polymer; a graft modified polyolefin; a brominated polystyrene; an amorphous polyester; an ethylene-propylene-diene terpolymer; a hydrogenated AB diblock copolymer; an acrylate-styrene-acrylonitrile terpolymer; and a poly(methyl methacrylate).

In some examples, the proppant can comprise about 5 wt % PEI or PEI copolymer or less, about 10 wt %, 15 wt %, 20 wt %, 25 wt %, 30 wt %, 35 wt %, 40, wt %, 45 wt %, 50 wt %, 55 wt %, 60 wt %, 65 wt %, 70 wt %, 75 wt %, 80 wt %, 85 wt %, 90 wt %, 95 wt %, 97 wt %, 98 wt %, about 99 wt %, or about 99.99 wt % PEI or PEI copolymer or more. In some embodiments, the proppant includes a PEI composite. A composite can include PEI, a PEI copolymer, or an inorganic material, such as, but not limited to zeolite, an inorganic nano composite, and silicone, such as various silicone rubbers, silicone polysiloxane polymers and polyorganosiloxanes, and polydiorganosiloxane-polycarbonate block copolymers. Inorganic materials can include, but are not limited to, boron fibers, boron nitride fibers, glass fibers, aluminum fibers, steel fibers, alumina fibers, carbon whiskers, mica, asbestos, sand, as well as others. Embodiments of the composite can include any suitable amount of inorganic material, such as about 5 wt % or less, about 10 wt %, 15 wt %, 20 wt %, 25 wt %, 30 wt %, 35 wt %, 40, wt %, 45 wt %, 50 wt %, 55 wt %, 60 wt %, 65 wt %, 70 wt %, 75 wt %, 80 wt %, 85 wt %, or about 90 wt % or more. In some examples, a PEI composite can include about 40% to about 85% by weight of any of the above described non-PEI materials. The PEI composite can include any suitable amount of PEI or PEI-copolymer, such as about 5 wt % PEI or PEI copolymer or less, about 10 wt %, 15 wt %, 20 wt %, 25 wt %, 30 wt %, 35 wt %, 40, wt %, 45 wt %, 50 wt %, 55 wt %, 60 wt %, 65 wt %, 70 wt %, 75 wt %, 80 wt %, 85 wt %, 90 wt %, 95 wt %, 97 wt %, 98 wt %, about 99 wt %, or about 99.99 wt % PEI or PEI copolymer or more, or about 15% to about 60% by weight PEI or PEI copolymer.

Such polymeric materials can improve the impact strength, or environmental stress resistance of proppants as compared to non-polymeric proppants. The proppant material, such as polymeric material, described herein can be spherical, cylindrical or any other shape or mixture of such shapes.

Various embodiments include a proppant that is generally spherical in shape ranging from about 10 mesh size to about 140 mesh size or generally cylindrical in shape with an aspect ratio (e.g., length:width) of about 0.5 or less, about 0.7, 0.9, 1.0, 1.2, 1.4, 1.6, 1.8, 1.9, 2.0, 2.2, 2.4, 2.6, about 2.8, or about 3.0 or more, or any other shape.

Method of Treatment

Various embodiments of the present invention provide a method of treating a subterranean formation. The method can include contacting a subterranean formation, such as downhole, with a polymeric proppant comprising at least polyetherimide (PEI), a PEI copolymer, or a PEI composite. The contacting of the proppant with the subterranean formation can be any suitable contacting. In some examples, the contacting can include contacting subterranean material within or proximate a fracture, such as a hydraulically induced fracture. In some examples, the method of treating the subterranean formation is a method of depositing a proppant, a method of stimulation, a method of fracturing, or any combination thereof.

The method of treating the subterranean formation can include transporting the proppant to the subterranean formation with a carrier fluid, such as a fracturing fluid. In some embodiments, the proppant can have lower specific gravity as compared to non-polymeric containing proppants. Benefits of such examples can include allowing for lower fracture fluid flowrates, lower viscosity fracturing fluid, or lower pressures during fracturing. In some embodiments, the fracturing fluid can be lower-viscosity fluid, while in other embodiments the fracturing fluid can be a higher-viscosity fluid. In an example, the proppant can allow for use of a lower viscosity fracturing fluid, such that more complete recovery of the fracturing fluid is possible; which can have advantages including, economic benefits or environmental benefits. By allowing for more complete recovery of a fracturing fluid or a carrier fluid used to deposit proppants, various embodiments can enable greater overall production from a production zone, and can enable the production of less contaminated material. Such embodiments can provide a decrease in fracturing cost, environmentally or economically.

In various embodiments of the present disclosure the carrier fluid or fracturing fluid can include, for example, a gel, a borate-crosslinked fluid, an organometallic-crosslinked fluid, an aluminum phosphate-ester oil gel, or a combination thereof. In other examples, the carrier or fracturing fluid can include a mineral oil, a hydrocarbon oil, water, brine, a silicone oil, an esterified fatty acid, an organic liquid, a solvent, or a combination thereof.

Various embodiments of the present disclosure can include a proppant with higher crush resistance than previous proppants. For example, a crush resistance to specific gravity ratio of the present disclosure can be greater than previous proppants. Crush resistance can include the weight percent fines generated at a specified pressure applied to the proppant. In an example, the proppant can have a crush resistance at 3,000 psi of about 1.0 wt % or less, 0.8 wt %, 0.6 wt %, 0.5 wt %, 0.3 wt %, 0.1 wt %, or about negligible wt %. In another example, the proppant can have a crush resistance at 10,000 psi of about 1.5 wt % or less, 1.3 wt % 1.1 wt %, 1.0 wt %, 0.8 wt %, 0.6 wt %, 0.5 wt %, 0.3 wt %, 0.1 wt %, or about negligible wt %. In another example, the proppant can have a crush resistance at 25,000 psi of about 2.0 wt % or less, 1.8 wt %, 1.6 wt %, 1.5 wt %, 1.3 wt % 1.1 wt %, 1.0 wt %, 0.8 wt %, 0.6 wt %, 0.5 wt %, 0.3 wt %, 0.1 wt %, or about negligible wt %. The higher crush resistance proppants can be used for treatment of subterranean formations with a higher closure pressure or less stable fractures. Further, polymeric proppants with higher crush resistivity can decrease the amount of fines generated or particles formed in subterranean formation, as compared to previous proppants. As such, long term fracture flow capacity can be increased. Such examples can provide a number of benefits including less fracture fouling, less wellbore fouling, increased stability of a fracture, or combinations thereof.

In various examples, the proppant can be porous, so as to permit fluid to pass through the proppant. The pore size in such proppants can vary from about 0.1 microns to about 10 microns. For example, the proppant can be porous enough to be permeable by a hydrocarbon, a gas, a fracturing fluid, or a carrier fluid. Such embodiments can provide the benefit of reducing the pressure or fluid velocity necessary to transport the proppant downhole.

In various examples, the proppant can be hollow, so as to permit fluid to pass through the proppant. Such embodiments can provide the benefit of reducing the pressure or fluid velocity necessary to transport the proppant downhole or increase the conductivity of the proppant pack.

In various embodiments, the proppant can be substantially insoluble in acid. For example, a mixture of hydrochloric acid and hydrofluoric acid in 12:3 ratio at 150 to 160° F. for 30 minutes can result in an acid solubility of about 5 wt % or less, 4 wt %, 3 wt %, 2 wt %, 1 wt %, or about 0.5 wt % or less of the weight of the proppant. Benefits of such embodiments include increased reliability of the proppant permitting use of additional or more highly acidic additives to the fracturing fluid that otherwise could be damaging to the proppant, or increased proppant shape retention when transported downhole.

Various examples include a proppant pack including a polymeric proppant, as described herein, wherein the proppant pack allows higher conductivity than a proppant pack including non-polymeric proppants, such as ceramic, glass, sand, or bauxite proppants of equivalent bulk volume at substantially equivalent operating conditions. Further, the proppant of the present invention can inhibit diagenesis more than ceramic, glass, sand, or bauxite proppants. For example, the strength, conductivity, crush resistance, substantial acid insolubility, hydrophobicity, or a combination thereof can inhibit diagenesis of the proppant or subterranean formation. In various examples, the proppant can include a resin-coated proppant. Resin can include any suitable resin for treating, stimulating, fracturing, or depositing the proppant.

In various embodiments, the crush resistance, acid resistivity, hydrophobicity, or lipophobicity can inhibit diagenesis when transported in contact to or within the subterranean formation. Benefits of such embodiments include greater long-term fracture flow capacity, stimulation of the subterranean formation with increased proppant lifespan, enhanced recovery of fracturing fluid, or at least partially preventing fluid buildup with a fracture.

Various example include, a polymeric proppant having a lower embedment when transported in contact or within subterranean formation. Benefits of such examples include sustained retention of the fracture width which in turn leads to sustained conductivity or production through the proppant pack.

Method of Depositing Proppant

Various embodiments of the present invention provide a method of depositing proppant into a subterranean formation. The method can include transporting the proppant to the subterranean formation with a carrier fluid or fracturing fluid, as described herein. For example, the carrier fluid can include a mineral oil, a hydrocarbon oil, water, brine, a silicone oil, an esterified fatty acid, an organic liquid, a solvent, or a combination thereof. Further, the method can include contacting the proppant with the subterranean formation, wherein the proppant can be polymeric including at least PEI, a PEI copolymer, a PEI composite, or a combination thereof. The method can include proppant with PEI concentrations as described herein.

Further embodiments can include, transporting the proppant at reduced pressures or flow rates, as compared to previous depositing methods.

In various embodiments of the invention, the lower specific gravity of the proppant, such as the hollow or porous proppant, as compared to previous proppants, permits use of a carrier fluid with a lower viscosity as compared to previous carrier fluids.

Method of Stimulation

In various embodiments, the present invention provides a method of stimulating production of a subterranean formation. The method can include fracturing a subterranean formation to form a fracture. For example, the method can include hydraulic fracturing to stimulate natural gas or hydrocarbons to increase or stimulate production. Contacting the fracture with the proppant pack can include contacting the proppant pack proximate the fracture to at least partially close the fracture so as to allow for passage of reservoir fluids to the wellbore. The method can include contacting the fracture with a proppant pack including a polymeric proppant including PEI, a proppant including a PEI copolymer, a proppant including a PEI composite, or proppant combinations thereof. Examples can include a proppant pack containing either generally spherical, generally cylindrical, or other shaped proppants, or combinations thereof. The method can include a proppant pack that allows greater conductivity than other proppant packs, such as a corresponding proppant pack of non-polymeric proppants, such as ceramic, glass, sand, or bauxite of substantially equivalent bulk volume at substantially equivalent operating conditions.

In various examples, the proppant can have a crush resistance at 3,000 psi of about 1.0 wt % or less, 0.8 wt %, 0.6 wt %, 0.5 wt %, 0.3 wt %, 0.1 wt %, or about negligible wt %. In another example, the proppant can have a crush resistance at 10,000 psi of about 1.5 wt % or less, 1.3 wt % 1.1 wt %, 1.0 wt %, 0.8 wt %, 0.6 wt %, 0.5 wt %, 0.3 wt %, 0.1 wt %, or about negligible wt %. In another example, the proppant can have a crush resistance at 25,000 psi of about 2.0 wt % or less, 1.8 wt %, 1.6 wt %, 1.5 wt %, 1.3 wt % 1.1 wt %, 1.0 wt %, 0.8 wt %, 0.6 wt %, 0.5 wt %, 0.3 wt %, 0.1 wt %, or about negligible wt %. Embodiments of the proppant having higher crush resistance can be used for treatment of subterranean formations with higher closure pressures or less stable fractures. Further, the proppants with higher crush resistivity can decrease the amount of fines generated or particles formed in subterranean formation, as compared to previous proppants. As such, long term fracture flow capacity can be increased. Such examples can provide a number of benefits including, but not limited to, less fracture fouling, less well bore fouling, or increased stability of a fracture.

Method of Fracturing

In various embodiments, the present invention provides a method of fracturing a subterranean formation, such as a subterranean material. The method of treating the subterranean formation can include transporting the proppant to the subterranean formation with a carrier fluid, such as a fracturing fluid. In some embodiments, the proppant can have lower specific gravity than non-polymeric proppants. Benefits of such examples can include allowing for lower fracture fluid flow rates, lower viscosity fracturing fluid, or lower pressures during fracturing. In some embodiments, the fracturing fluid can be lower-viscosity, while in other embodiments the fracturing fluid can be a higher-viscosity fluid. In an example, the proppant can permit use of a lower viscosity fracturing fluid, such that more complete recovery of the fracturing fluid is possible; which can have advantages, including, but not limited to, economic benefits or environmental benefits. By allowing for more complete recovery of a fracturing fluid or a carrier fluid used to deposit proppants, various embodiments can enable greater overall production from a production zone, and can enable the production of less contaminated material. Such embodiments can translate to a decrease in fracturing cost, such as environmentally or economically.

The method can include fracturing downhole at least part of a subterranean material using a fracturing fluid to create a fracture. In an example, the fracturing fluid can be substantially the same as the carrier fluid. For example, the fracturing or carrying fluid can include a mineral oil, a hydrocarbon oil, water, brine, a silicone oil, an esterified fatty acid, an organic liquid, a solvent, or a combination thereof. Further, the fracturing can include high-rate fracturing, high-viscosity fracturing, or a combination thereof. High-rate fracturing includes higher fracturing fluid velocities, whereas high-viscosity fracturing includes lower fluid velocities but higher-viscosity fracturing fluids.

Various examples include, during or following the fracturing, contacting the fracture with the carrier fluid, wherein the proppant at least partially maintaining the fracture open. For example, the crush resistance of the proppant can aid in maintain the fracture at least partially open. In various examples, the proppant can have a crush resistance at 3,000 psi of about 1.0 wt % or less, 0.8 wt %, 0.6 wt %, 0.5 wt %, 0.3 wt %, 0.1 wt %, or about negligible wt %. In another example, the proppant can have a crush resistance at 10,000 psi of about 1.5 wt % or less, 1.3 wt % 1.1 wt %, 1.0 wt %, 0.8 wt %, 0.6 wt %, 0.5 wt %, 0.3 wt %, 0.1 wt %, or about negligible wt %. In another example, the proppant can have a crush resistance at 25,000 psi of about 2.0 wt % or less, 1.8 wt %, 1.6 wt %, 1.5 wt %, 1.3 wt % 1.1 wt %, 1.0 wt %, 0.8 wt %, 0.6 wt %, 0.5 wt %, 0.3 wt %, 0.1 wt %, or about negligible wt %.

In various examples, the proppant can also be porous or hollow, so as to permit fluid to pass through the proppant. For example, the proppant can be porous or hollow so as to be permeable by fracturing fluid or carrier fluid. Such embodiments can provide the benefit of reducing the pressure or fluid velocity necessary to transport the proppant downhole.

In various embodiments, the proppant can be substantially insoluble in acid. Benefits of such embodiments include increased reliability of the proppant permitting use of additional or more highly acidic additives to fracturing fluid that otherwise could damage the proppant, or increased proppant shape retention when transported downhole.

Composition for Treatment of a Subterranean Formation

In various embodiments, the present invention provides a composition for treatment of a subterranean formation. The composition can include a carrier fluid comprising a polymeric proppant containing PEI, a PEI copolymer, a PEI composite, or a combination thereof, such that the proppant includes about 10 wt % to about 100 wt % PEI. Further, various embodiments of the composition include a proppant with a higher strength to specific gravity ratio, as described herein, when compared to previous compositions.

In various embodiments of the present disclosure, the carrier fluid or fracturing fluid can include, for examples, a gel, a borate-crosslinked fluid, an organometallic-crosslinked fluid, an aluminum phosphate-ester oil gel, or a combination thereof. In other examples, the carrier fluid or fracturing fluid can include a mineral oil, a hydrocarbon oil, water, brine, a silicone oil, an esterified fatty acid, an organic liquid, a solvent, or a combination thereof.

Method of Sand Control

Polymeric proppants, such as proppants containing PEI, a PEI copolymer, a PEI composite, or a combination thereof, can be used for gravel packing in a subterranean formation to control sand production. Sand control problems can include, but are not limited to, reduced production rates, sand bridging, erosion of equipment, and sand disposal and removal. The polymeric proppant can be pumped in a near wellbore region with a carrier fluid or a fracking fluid. The polymeric proppant can include a specified shape or size, such that a proppant bed can be formed. The proppant bed can be configured to mitigate generated fines from migrating from a formation to the near wellbore region and cause any plugging of the flow path. The polymeric proppants can be treated using a suitable resin to form a consolidated pack that can aid in preventing any fines from migrating and plugging the flow of the hydrocarbon to the wellbore.

EXAMPLES

The present invention can be better understood by reference to the following Examples, which are offered by way of illustration. The present invention is not limited to the Examples given herein.

Example 1

Sieve Analysis

Particle size distribution determined the proppant packing in the fracture and, therefore, impacted the conductivity of the packing. The size distribution was determined by sieve analysis. The sieve analyses were done in accordance with procedure as described in ISO 13503-2 standard. The procedure used a stack of sieves with a pan at the bottom of the stack. The sieve sizes in the stack were selected as described in the ISO 13503-2 standard. A sample of 100 grams of split sample was placed on the topmost sieve in the stack. The stack was then placed in a sieve shaker for 10 minutes. Subsequently the amount of proppant retained on each sieve was noted and reported as percentage retained. During the analysis, 90 wt % of the PEI proppant proppants were passed through sieve 8 (2380 micron) and were retained on sieve 12 (1680 micron).

Example 2

Acid Solubility

An acid solubility test determined the stability of the polymeric proppant in an acidic medium. The test was done in accordance with procedure as mentioned in ISO 13503-2, wherein a mixture of hydrochloric acid and hydrofluoric acid in a 12:3 ratio at 150° F. and 160° F. was used in 30 minute durations. The test results showed the solubility of polymeric proppants was less than 1 wt %.

Example 3

Crush Resistance

Proppant breakage and fine generation causes decreased pack conductivity due to the generated fine flowing with the recovered hydrocarbon and consequently plugging the flow channels. Crush resistance determined the maximum crushing force that the proppant may experience once the fracture is closed and the well is put in production. The crush resistance test was done in accordance with the procedure as mentioned in the ISO 13503-2 standard. The procedure involved taking a known weight of a sample in the test cell and applying a load at constant rate. The load was maintained on the proppant for a defined time. This was followed by sieving the proppants and determining the amount of fines generated. The test was carried at different pressure, including 3000 psi, 10000 psi, and 15000 psi. The polymeric proppants showed less than 0.5 wt % fines generated as a result of the applied pressure, as shown in Table 1.

TABLE 1

Crush Resistant Test Results

| Sample No. | Ultimate force (lbf) | Ultimate pressure (psi) | Percent fines (%) |
| --- | --- | --- | --- |
| 1 | 9,430 | 3,000 | N/A |
| 2 | 31,400 | 10,000 | N/A |
| 3 | 47,100 | 15,000 | <0.5% |

Example 4

Thermal Gravimetric Analysis (TGA)

Figure 1:
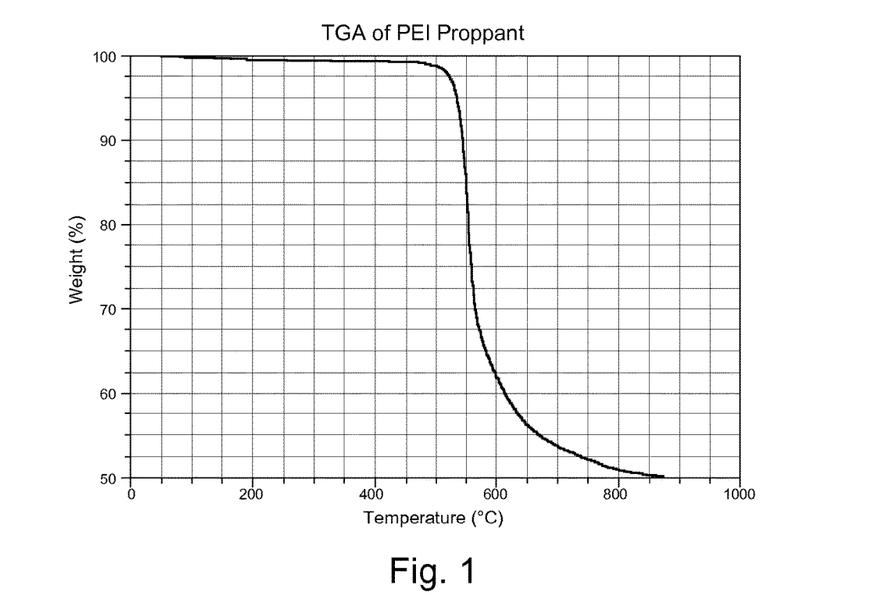
FIG. 1 illustrates a thermal gravimetric analysis of a polyetherimide proppant, in accordance with various embodiments of the present disclosure.

Thermal gravimetric analysis was done to determine the temperature stability of the PEI proppant. A known weight of the proppant was taken in a platinum crucible and placed in a weighing balance of a TGA instrument. The temperature of the instrument was gradually increased at a constant rate and the loss of proppant weight was measured for each temperature as shown in FIG. 1.

Example 5

Proppant Embedment Test

Figure 2:
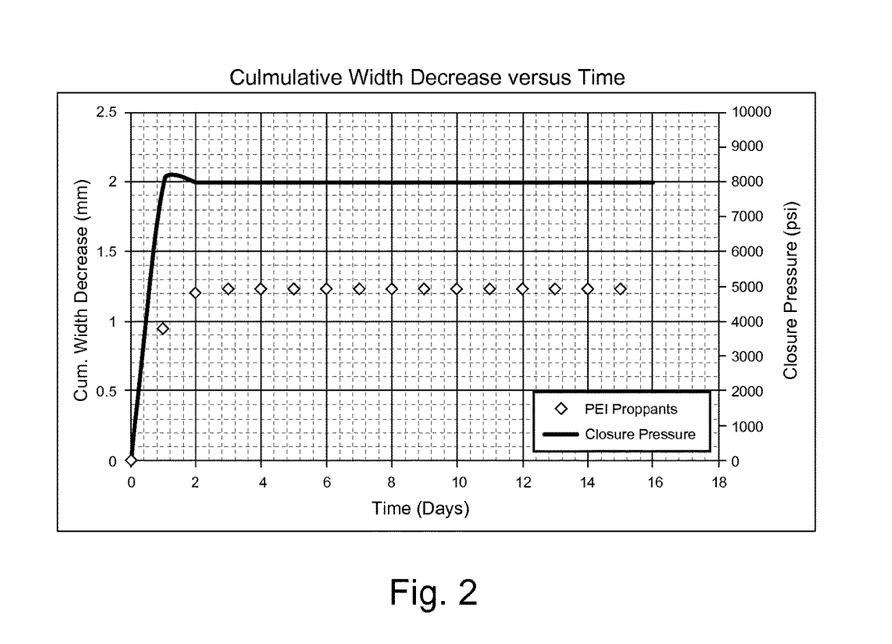
FIG. 2 illustrates a proppant embedment test including cumulative width decrease versus time, in accordance with various embodiments of the present disclosure.

A proppant embedment test was conducted to assess the likelihood and the severity of the impact of the proppant on formation rock. The testing was performed at simulated wellbore conditions for temperature and closure pressure. The experiment utilizes stress cells that consist of a bottom hub and a top hub assisted with 4 springs. Two formation wafers with a 1.0 inch diameter and 0.5 inch height were used to prepare the formation wafer and proppant sandwich. Each test cell can be heated to 175° F. and were exposed to a closure stress of 8000 psi applied to mimic wellbore conditions. The test conditions are maintained for periods of up to three weeks. Periodic measurements were made to determine the change in the proppant pack width, as shown in FIG. 2.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising contacting the subterranean formation with a polymeric proppant comprising polyetherimide (PEI).

Embodiment 2 provides the method of Embodiment 1, wherein the polymeric proppant comprises a PEI copolymer, a PEI composite, or a combination thereof.

Embodiment 3 provides the method of at least one of or any combination of Embodiments 1-2, wherein the PEI composite includes zeolite, an inorganic nano composite, silicone, a silicone rubber, a silicone polysiloxane polymer, polyorganosiloxane, a polydiorganosiloxane-polycarbonate block copolymer, a boron fiber, a boron nitride fiber, a glass fiber, an aluminum fiber, a steel fiber, an alumina fiber, a carbon whisker, mica, asbestos, sand, or a combination thereof.

Embodiment 4 provides the method of at least one of or any combination of Embodiments 1-3, wherein the PEI composite includes about 15 wt % to about 60 wt % PEI.

Embodiment 5 provides the method of at least one of or any combination of Embodiments 1-4, wherein PEI copolymer includes a polymer with a repeating PEI unit and at least one polymer selected from the group consisting of polyphenylene ether (repeating unit=phenoxy), polyimide (repeating unit includes the structure RC(=O)NR'C(=O)R"), poly(4-vinylpyridine)(repeating unit=4-ethylpyridine), polyvinylpyrrolidone (repeating unit =1-ethylpyrrolidone), polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

Embodiment 6 provides the method of at least one of or any combination of Embodiments 1-5, wherein the proppant is porous including a pore size from about 0.1 microns to about 10 microns.

Embodiment 7 provides the method of at least one of or any combination of Embodiments 1-6, further comprising transporting the polymeric proppant to the subterranean formation with a carrier fluid.

Embodiment 8 provides the method of at least one of or any combination of Embodiments 1-7, wherein the carrier fluid comprises a mineral oil, a hydrocarbon oil, water, a silicone oil, an esterified fatty acid, an organic liquid, a solvent, or a combination thereof.

Embodiment 9 provides the method of at least one of or any combination of Embodiments 1-8, wherein acid solubility of the polymeric proppant is less than about 2 wt %.

Embodiment 10 provides the method of at least one of or any combination of Embodiments 1-9, wherein the polymeric proppant has a crush resistance of less than about 0.5 wt % at about 3,000 pounds per square inch (psi).

Embodiment 11 provides the method of at least one of or any combination of Embodiments 1-10, wherein the polymeric proppant has a crush resistance of less than about 1.0 wt % at about 10,000 psi.

Embodiment 12 provides the method of at least one of or any combination of Embodiments 1-11, wherein the polymeric proppant has a crush resistance of less than about 1.5 wt % at about 25,000 psi.

Embodiment 13 provides the method of at least one of or any combination of Embodiments 1-12, wherein the polymeric proppant inhibits diagenesis more than a non-polymeric proppant.

Embodiment 14 provides the method of at least one of or any combination of Embodiments 1-13, wherein contacting the subterranean formation includes contacting the subterranean formation with a proppant pack comprising the polymeric proppant, the proppant pack configured to allow higher conductivity than a corresponding proppant pack comprising a non-polymeric proppant of substantially equivalent bulk volume at substantially equivalent operating conditions.

Embodiment 15 provides the method of at least one of or any combination of Embodiments 1-14, wherein the polymeric proppant comprises a resin-coated proppant.

Embodiment 16 provides a method of depositing proppant into a subterranean formation, the method comprising transporting the proppant to the subterranean formation with a carrier fluid, wherein the proppant is a polymeric proppant including polyetherimide (PEI), contacting the proppant with the subterranean formation, and recovering at least a portion of the carrier fluid.

Embodiment 17 provides the method of Embodiment 16, wherein the proppant is cylindrical in shape with an aspect ratio of about 0.5 to about 3.0.

Embodiment 18 provides the method of at least one of or any combination of Embodiments 16-17, wherein the carrier fluid is a fracturing fluid comprising a gel, a borate-crosslinked fluid, an organometallic-crosslinked fluid, an aluminum phosphate-ester oil gel or a combination thereof.

Embodiment 19 provides the method of at least one of or any combination of Embodiments 16-18, wherein the polymeric proppant comprises a PEI copolymer, a PEI composite, or a combination thereof.

Embodiment 20 provides the method of at least one of or any combination of Embodiments 16-19, wherein the PEI composite includes zeolite, an inorganic nano composite, silicone, a silicone rubber, a silicone polysiloxane polymer, polyorganosiloxane, a polydiorganosiloxane-polycarbonate block copolymer, a boron fiber, a boron nitride fiber, a glass fiber, an aluminum fiber, a steel fiber, an alumina fiber, a carbon whisker, mica, asbestos, sand, or a combination thereof.

Embodiment 21 provides the method of at least one of or any combination of Embodiments 16-20, wherein the PEI composite includes about 15 wt % to about 60 wt % PEI.

Embodiment 22 provides the method of at least one of or any combination of Embodiments 16-21, wherein PEI copolymer includes a polymer with a repeating PEI unit and at least one polymer selected from the group consisting of polyphenylene ether (repeating unit=phenoxy), polyimide (repeating unit includes the structure RC(=O)NR'C(=O)R"), poly(4-vinylpyridine)(repeating unit=4-ethylpyridine), polyvinylpyrrolidone (repeating unit =1-ethylpyrrolidone), polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

Embodiment 23 provides the method of at least one of or any combination of Embodiments 16-22, wherein the proppant is porous including a pore size from about 0.1 microns to about 10 microns.

Embodiment 24 provides the method of at least one of or any combination of Embodiments 16-23, wherein acid solubility of the polymeric proppant is less than about 2 wt %.

Embodiment 25 provides the method of at least one of or any combination of Embodiments 16-24, wherein the polymeric proppant has a crush resistance of less than about 0.5 wt % at about 3,000 pounds per square inch (psi).

Embodiment 26 provides the method of at least one of or any combination of Embodiments 16-25, wherein the polymeric proppant has a crush resistance of less than about 1.0 wt % at about 10,000 psi.

Embodiment 27 provides the method of at least one of or any combination of Embodiments 16-26, wherein the polymeric proppant has a crush resistance of less than about 1.5 wt % at about 25,000 psi.

Embodiment 28 provides the method of at least one of or any combination of Embodiments 16-27, wherein the polymeric proppant inhibits diagenesis more than a non-polymeric proppant.

Embodiment 29 provides the method of at least one of or any combination of Embodiments 16-28, wherein contacting the subterranean formation includes contacting the subterranean formation with a proppant pack comprising the polymeric proppant, the proppant pack configured to allow higher conductivity than a corresponding proppant pack comprising a non-polymeric proppant of substantially equivalent bulk volume at substantially equivalent operating conditions.

Embodiment 30 provides the method of at least one of or any combination of Embodiments 16-29, wherein the polymeric proppant comprises a resin-coated proppant.

Embodiment 31 provides a method of stimulating production of a subterranean formation, the method comprising fracturing a subterranean formation to form a fracture, and contacting the fracture with a proppant pack comprising a polyetherimide (PEI) proppant, wherein the proppant pack allows greater conductivity than a corresponding proppant pack comprising a non-PEI proppant of substantially equivalent bulk volume at substantially equivalent operating conditions.

Embodiment 32 provides the method of Embodiment 31, wherein the PEI proppant is cylindrical in shape with an aspect ratio of about 0.5 to about 3.0.

Embodiment 33 provides the method of at least one of or any combination of Embodiments 31-32, further comprising transporting the PEI proppant to the subterranean formation with a carrier fluid.

Embodiment 34 provides the method of at least one of or any combination of Embodiments 31-33, wherein the carrier fluid is a fracturing fluid comprising a gel, a borate-crosslinked fluid, an organometallic-crosslinked fluid, an aluminum phosphate-ester oil gel or a combination thereof.

Embodiment 35 provides the method of at least one of or any combination of Embodiments 31-34, wherein the PEI proppant comprises a PEI copolymer, a PEI composite, or a combination thereof.

Embodiment 36 provides the method of at least one of or any combination of Embodiments 31-35, wherein the PEI composite includes zeolite, an inorganic nano composite, silicone, a silicone rubber, a silicone polysiloxane polymer, polyorganosiloxane, a polydiorganosiloxane-polycarbonate block copolymer, a boron fiber, a boron nitride fiber, a glass fiber, an aluminum fiber, a steel fiber, an alumina fiber, a carbon whisker, mica, asbestos, sand, or a combination thereof.

Embodiment 37 provides the method of at least one of or any combination of Embodiments 31-36, wherein the PEI composite includes about 15 wt % to about 60 wt % PEI.

Embodiment 38 provides the method of at least one of or any combination of Embodiments 31-37, wherein PEI copolymer includes a polymer with a repeating PEI unit and at least one polymer selected from the group consisting of polyphenylene ether (repeating unit=phenoxy), polyimide (repeating unit includes the structure RC(=O)NR'C(=O)R"), poly(4-vinylpyridine)(repeating unit=4-ethylpyridine), polyvinylpyrrolidone (repeating unit =1-ethylpyrrolidone), polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

Embodiment 39 provides the method of at least one of or any combination of Embodiments 31-38, wherein the PEI proppant is porous including a pore size from about 0.1 microns to about 10 microns.

Embodiment 40 provides the method of at least one of or any combination of Embodiments 31-39, wherein acid solubility of the PEI proppant is less than about 2 wt %.

Embodiment 41 provides the method of at least one of or any combination of Embodiments 31-40, wherein the PEI proppant has a crush resistance of less than about 0.5 wt % at about 3,000 pounds per square inch (psi).

Embodiment 42 provides the method of at least one of or any combination of Embodiments 31-41, wherein the PEI proppant has a crush resistance of less than about 1.0 wt % at about 10,000 psi.

Embodiment 43 provides the method of at least one of or any combination of Embodiments 31-42, wherein the PEI proppant has a crush resistance of less than about 1.5 wt % at about 25,000 psi.

Embodiment 44 provides the method of at least one of or any combination of Embodiments 31-43, wherein the PEI proppant inhibits diagenesis more than a non-polymeric proppant.

Embodiment 45 provides the method of at least one of or any combination of Embodiments 31-44, wherein the PEI proppant comprises a resin-coated proppant.

Embodiment 46 provides a method of fracturing a subterranean material, comprising obtaining or providing a carrier fluid comprising a polymeric proppant, wherein the polymeric proppant includes polyetherimide (PEI), fracturing downhole at least part of a subterranean material using a fracturing fluid to create a fracture, and during or following the fracturing, contacting the fracture with the carrier fluid, wherein the polymeric proppant at least partially maintains the fracture open.

Embodiment 47 provides the method of Embodiment 46, wherein the fracturing comprises high-rate fracturing, high-viscosity fracturing, or a combination therein.

Embodiment 48 provides the method of at least one of or any combination of Embodiments 46-47, wherein the carrier fluid is substantially the same as the fracturing fluid.

Embodiment 49 provides the method of at least one of or any combination of Embodiments 46-48, wherein the fracturing fluid comprises a gel, a borate-crosslinked fluid, an organometallic-crosslinked fluid, an aluminum phosphate-ester oil gel, or a combination therein.

Embodiment 50 provides the method of at least one of or any combination of Embodiments 46-49, wherein the proppant is cylindrical in shape with an aspect ratio of about 0.5 to about 3.0.

Embodiment 51 provides the method of at least one of or any combination of Embodiments 46-50, wherein the carrier fluid is a fracturing fluid comprising a gel, a borate-crosslinked fluid, an organometallic-crosslinked fluid, an aluminum phosphate-ester oil gel or a combination thereof.

Embodiment 52 provides the method of at least one of or any combination of Embodiments 46-51, wherein the polymeric proppant comprises a PEI copolymer, a PEI composite, or a combination thereof.

Embodiment 53 provides the method of at least one of or any combination of Embodiments 46-52, wherein the PEI composite includes zeolite, an inorganic nano composite, silicone, a silicone rubber, a silicone polysiloxane polymer, polyorganosiloxane, a polydiorganosiloxane-polycarbonate block copolymer, a boron nitride fiber, a glass fiber, an aluminum fiber, a steel fiber, an alumina fiber, a carbon whisker, mica, asbestos, sand, or a combination thereof.

Embodiment 54 provides the method of at least one of or any combination of Embodiments 46-53, wherein the PEI composite includes about 15 wt % to about 60 wt % PEI.

Embodiment 55 provides the method of at least one of or any combination of Embodiments 46-54, wherein PEI copolymer includes a polymer with a repeating PEI unit and at least one polymer selected from the group consisting of polyphenylene ether (repeating unit=phenoxy), polyimide (repeating unit includes the structure RC(═O)NR'C(═O) R"), poly(4-vinylpyridine)(repeating unit=4-ethylpyridine), polyvinylpyrrolidone (repeating unit =1-ethylpyrrolidone), polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

Embodiment 56 provides the method of at least one of or any combination of Embodiments 46-55, wherein the proppant is porous including a pore size from about 0.1 microns to about 10 microns.

Embodiment 57 provides the method of at least one of or any combination of Embodiments 46-56, wherein acid solubility of the polymeric proppant is less than about 2 wt %.

Embodiment 58 provides the method of at least one of or any combination of Embodiments 46-57, wherein the polymeric proppant has a crush resistance of less than about 0.5 wt % at about 3,000 pounds per square inch (psi).

Embodiment 59 provides the method of at least one of or any combination of Embodiments 46-58, wherein the polymeric proppant has a crush resistance of less than about 1.0 wt % at about 10,000 psi.

Embodiment 60 provides the method of at least one of or any combination of Embodiments 46-59, wherein the polymeric proppant has a crush resistance of less than about 1.5 wt % at about 25,000 psi.

Embodiment 61 provides the method of at least one of or any combination of Embodiments 46-60, wherein the polymeric proppant inhibits diagenesis more than a non-polymeric proppant.

Embodiment 62 provides the method of at least one of or any combination of Embodiments 46-61, wherein contacting the subterranean formation includes contacting the subterranean formation with a proppant pack comprising the polymeric proppant, the proppant pack configured to allow higher conductivity than a corresponding proppant pack comprising a non-polymeric proppant of substantially equivalent bulk volume at substantially equivalent operating conditions.

Embodiment 63 provides the method of at least one of or any combination of Embodiments 46-62, wherein the polymeric proppant comprises a resin-coated proppant.

Embodiment 64 provides a method for sand control, comprising transporting a carrier fluid including a polymeric proppant down a wellbore to a subterranean formation, contacting at least the polymeric proppant with the subterranean formation, and forming a polymeric proppant bed configured to substantially prevent fines from entering the wellbore.

Embodiment 65 provides the method of Embodiment 64, wherein the proppant is cylindrical in shape with an aspect ratio of about 0.5 to about 3.0.

Embodiment 66 provides the method of at least one of or any combination of Embodiments 64-65, wherein the carrier fluid is a fracturing fluid comprising a gel, a borate-crosslinked fluid, an organometallic-crosslinked fluid, an aluminum phosphate-ester oil gel or a combination thereof.

Embodiment 67 provides the method of at least one of or any combination of Embodiments 64-66, wherein the polymeric proppant comprises a PEI copolymer, a PEI composite, or a combination thereof.

Embodiment 68 provides the method of at least one of or any combination of Embodiments 64-67, wherein the PEI composite includes zeolite, an inorganic nano composite, silicone, a silicone rubber, a silicone polysiloxane polymer, polyorganosiloxane, a polydiorganosiloxane-polycarbonate block copolymer, a boron fiber, a boron nitride fiber, a glass fiber, an aluminum fiber, a steel fiber, an alumina fiber, a carbon whisker, mica, asbestos, sand, or a combination thereof.

Embodiment 69 provides the method of at least one of or any combination of Embodiments 64-68, wherein the PEI composite includes about 15 wt % to about 60 wt % PEI.

Embodiment 70 provides the method of at least one of or any combination of Embodiments 64-69, wherein PEI copolymer includes a polymer with a repeating PEI unit and at least one polymer selected from the group consisting of polyphenylene ether (repeating unit=phenoxy), polyimide (repeating unit includes the structure RC(═O)NR'C(═O) R"), poly(4-vinylpyridine)(repeating unit=4-ethylpyridine), polyvinylpyrrolidone (repeating unit =1-ethylpyrrolidone), polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

Embodiment 71 provides the method of at least one of or any combination of Embodiments 64-70, wherein the proppant is porous including a pore size from about 0.1 microns to about 10 microns.

Embodiment 72 provides the method of at least one of or any combination of Embodiments 64-71, wherein acid solubility of the polymeric proppant is less than about 2 wt %.

Embodiment 73 provides the method of at least one of or any combination of Embodiments 64-72, wherein the polymeric proppant has a crush resistance of less than about 0.5 wt % at about 3,000 pounds per square inch (psi).

Embodiment 74 provides the method of at least one of or any combination of Embodiments 64-73, wherein the polymeric proppant has a crush resistance of less than about 1.0 wt % at about 10,000 psi.

Embodiment 75 provides the method of at least one of or any combination of Embodiments 64-74, wherein the polymeric proppant has a crush resistance of less than about 1.5 wt % at about 25,000 psi.

Embodiment 76 provides the method of at least one of or any combination of Embodiments 64-75, wherein the polymeric proppant inhibits diagenesis more than a non-polymeric proppant.

Embodiment 77 provides the method of at least one of or any combination of Embodiments 64-76, wherein contacting the subterranean formation includes contacting the subterranean formation with a proppant pack comprising the polymeric proppant, the proppant pack configured to allow higher conductivity than a corresponding proppant pack comprising a non-polymeric proppant of substantially equivalent bulk volume at substantially equivalent operating conditions.

Embodiment 78 provides the method of at least one of or any combination of Embodiments 64-77, wherein the polymeric proppant comprises a resin-coated proppant.

Embodiment 79 provides a composition for treatment of a subterranean formation, the composition comprising a carrier fluid comprising a polymeric proppant comprising about 10 wt % to about 100 wt % polyetherimide (PEI).

Embodiment 80 provides the composition of Embodiment 79, wherein the carrier fluid comprises a mineral oil, a hydrocarbon oil, water, brine, a silicone oil, an esterified fatty acid, an organic liquid, a solvent, or a combination thereof.

Embodiment 81 provides the composition of at least one of or any combination of Embodiments 79-80, wherein the polymeric proppant comprises a PEI copolymer, a PEI composite, or a combination thereof.

Embodiment 82 provides the composition of at least one of or any combination of Embodiments 79-81, wherein the PEI composite includes zeolite, an inorganic nano composite, silicone, a silicone rubber, a silicone polysiloxane polymer, polyorganosiloxane, a polydiorganosiloxane-polycarbonate block copolymer, a boron fiber, a boron nitride fiber, a glass fiber, an aluminum fiber, a steel fiber, an alumina fiber, a carbon whisker, mica, asbestos, sand, or a combination thereof.

Embodiment 83 provides the composition of at least one of or any combination of Embodiments 79-82, wherein the PEI composite includes about 15 wt % to about 60 wt % PEI.

Embodiment 84 provides the composition of at least one of or any combination of Embodiments 79-83, wherein PEI copolymer includes a polymer with a repeating PEI unit and at least one polymer selected from the group consisting of polyphenylene ether (repeating unit=phenoxy), polyimide (repeating unit includes the structure RC(=O)NR'C(=O)R"), poly(4-vinylpyridine) (repeating unit=4-ethylpyridine), polyvinylpyrrolidone (repeating unit=1-ethylpyrrolidone), polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

Embodiment 85 provides the composition of at least one of or any combination of Embodiments 79-84, wherein the proppant is porous including a pore size from about 0.1 microns to about 10 microns.

Embodiment 86 provides the composition of at least one of or any combination of Embodiments 79-85, wherein acid solubility of the polymeric proppant is less than about 2 wt %.

Embodiment 87 provides the composition of at least one of or any combination of Embodiments 79-86, wherein the polymeric proppant has a crush resistance of less than about 0.5 wt % at about 3,000 pounds per square inch (psi).

Embodiment 88 provides the composition of at least one of or any combination of Embodiments 79-87, wherein the polymeric proppant has a crush resistance of less than about 1.0 wt % at about 10,000 psi.

Embodiment 89 provides the composition of at least one of or any combination of Embodiments 79-88, wherein the polymeric proppant has a crush resistance of less than about 1.5 wt % at about 25,000 psi.

Embodiment 90 provides the composition of at least one of or any combination of Embodiments 79-89, wherein the polymeric proppant inhibits diagenesis more than a non-polymeric proppant.

Embodiment 91 provides the composition of at least one of or any combination of Embodiments 79-90, wherein the polymeric proppant comprises a resin-coated proppant.

Embodiment 92 provides the method or composition of any one or any combination of Embodiments 1-91 optionally configured such that all elements or options recited are available to use or select from.

What is claimed is:

1. A method of treating a subterranean formation, comprising:
   placing in the subterranean formation a polymeric proppant consisting essentially of at least 90 wt % polyetherimide (PEI) or a PEI copolymer, wherein the polymeric proppant has a crush resistance of 1.5 wt % or less at about 10,000 pounds per square inch (psi).

2. The method of claim 1, wherein the polymeric proppant comprises the PEI copolymer.

3. The method of claim 2, wherein the PEI copolymer comprises a polymer with a repeating PEI unit and at least one polymer selected from the group consisting of polyphenylene ether, polyimide, poly(4-vinylpyridine), polyvinylpyrrolidone, polycarbonate, a polyacrylate, a polyolefin, a rubbery dienic polymer, a styrenic polymer, a graft modified polyolefin, a brominated polystyrene, an amorphous polyester, an ethylene-propylene-diene terpolymer, a hydrogenated AB diblock copolymer, an acrylate-styrene-acrylonitrile terpolymer, and a poly(methyl methacrylate).

4. The method of claim 1, further comprising transporting the polymeric proppant to the subterranean formation with a carrier fluid.

5. The method of claim 4, wherein the carrier fluid further comprises a mineral oil, a hydrocarbon oil, a silicone oil, an organic liquid, a solvent, or a combination thereof.

6. The method of claim 1, wherein placing the polymeric proppant in the subterranean formation comprises placing in the subterranean formation a proppant pack comprising the polymeric proppant, the proppant pack configured to allow higher conductivity than a corresponding proppant pack comprising a non-polymeric proppant of substantially equivalent bulk volume at substantially equivalent operating conditions.

7. The method of claim 1, wherein the polymeric proppant is not a resin-coated proppant.

8. The method of claim 4, further comprising recovering at least a portion of the carrier fluid.

9. The method of claim 8, wherein the polymeric proppant is cylindrical in shape with an aspect ratio of about 0.5 to about 3.0, and wherein the polymeric proppant has pore size in a range from about 0.1 microns to about 10 microns.

10. The method of claim 8, wherein the carrier fluid is a fracturing fluid comprising a borate-crosslinked fluid, an organometallic-crosslinked fluid, an aluminum phosphate-ester oil gel, or a combination thereof.

11. The method of claim 1, further comprising:
    fracturing the subterranean formation using a fracturing fluid to form a fracture;
    during or following the fracturing, contacting the fracture with the carrier fluid comprising the polymeric proppant; and
    maintaining the fracture at least partially open with the polymeric proppant.

12. The method of claim 11, wherein the fracturing fluid comprises the polymeric proppant.

13. The method of claim 11, wherein the fracturing fluid comprises a borate-crosslinked fluid, an organometallic-crosslinked fluid, an aluminum phosphate-ester oil gel, or a combination therein.

14. The method of claim 1, wherein placing the polymeric proppant in the subterranean formation comprises forming a polymeric proppant bed configured to substantially prevent fines from entering a wellbore.

15. The method of claim 1, wherein the polymeric proppant has a crush resistance of 1 wt % or less at about 10,000 psi.

16. The method of claim 1, wherein the polymeric proppant has a crush resistance of 0.5 wt % or less at about 10,000 psi.

17. The method of claim 1, wherein the polymeric proppant has a crush resistance of 2 wt % or less at about 25,000 psi.

* * * * *